July 3, 1928.
O. A. WIRKKALA
CHOKER HOOK RIGGING
Filed Feb. 6, 1926
1,675,778
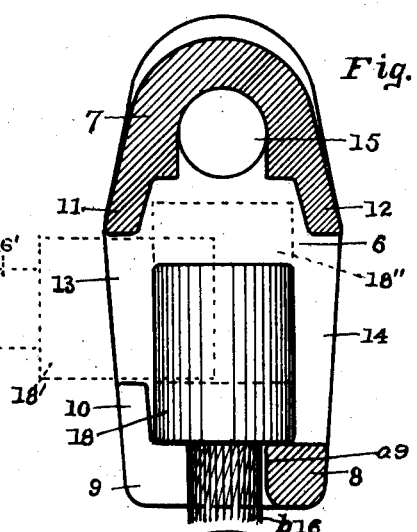
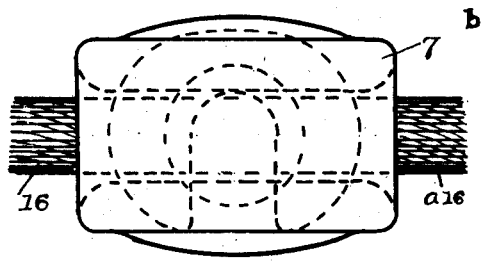
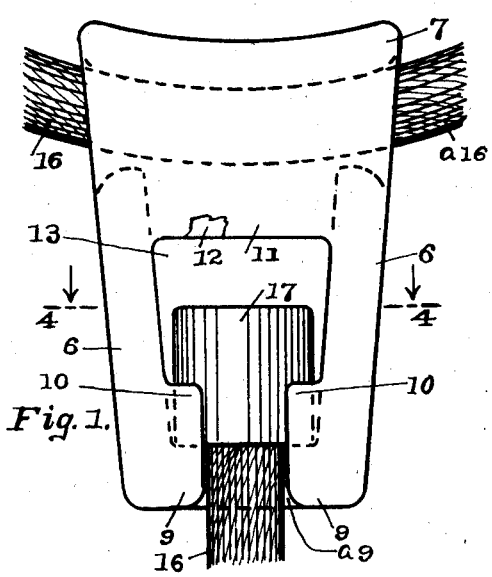
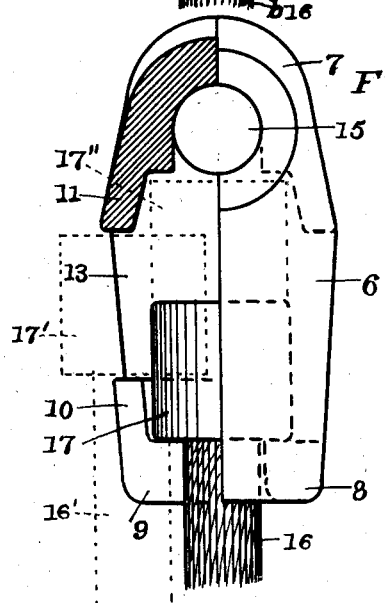
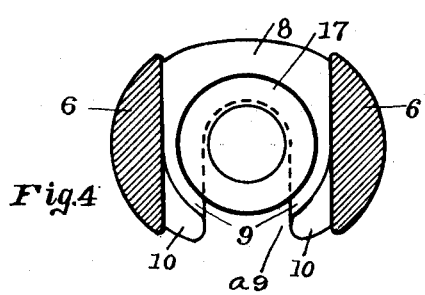
Oscar A. Wirkkala,
INVENTOR.
BY David E. Lain,
ATTORNEY.

Patented July 3, 1928.

1,675,778

UNITED STATES PATENT OFFICE.

OSCAR A. WIRKKALA, OF DEMING, WASHINGTON.

CHOKER-HOOK RIGGING.

Application filed February 6, 1926. Serial No. 86,485.

My invention relates to improvements in choker hook rigging used in logging more especially designed for steel cast hooks and knobbed cables to engage therewith, and one of the objects of my improvement is to provide a choker hook suited for engagement with a cable having a knob of certain dimensions when the latter is presented to the hook in a certain nonoperative position and also suited for engagement with a cable having a knob of other dimensions when the latter is presented in another nonoperative position thereto. And another object of my improvement is to provide a hook having a recess adapted to receive the cable knob when it leaves its operative seat during slack cable.

I attain this object with the mechanism illustrated in the accompanying sheet of drawings, forming a part of this specification, in which Figure 1 is a front elevation of my choker hook with the choker cable engaged therewith in operative relation and in which the part of the cable adapted for looping around a log and the end of the cable connected to the bull hook are both broken away for lack of space, Fig. 2 is a plan view of Fig. 1, Fig. 3 is an end elevation of Fig. 1 in quarter section on a medial vertical plane and in which the choker line is not in place in the eye sleeve, Fig. 4 is a plan view of Fig. 1 in section on a horizontal plane through the line 4—4 of Fig. 1, and Fig. 5 is a replica of Fig. 3 fully in section on a medial vertical plane and engaged with a cable having a longer knob than shown in Fig. 3.

I have been granted Patent Number 1,464,162 on Aug. 7, 1923, for choker hooks on which my present invention is an improvement both as to the hook itself and also as to the cable disclosed in said patent.

My new choker hook consists of two pillars 6, 6 disposed between eye sleeve 7 and hook point or jaws 8, 9, 9, said jaws being in shape of a U of which 8 is the connecting part. Said pillars intersect said jaws and eye sleeve and are preferably integral therewith constituting the hook shank. At the end of each of jaws 9 is vertical boss 10. Between the upper ends of pillars 6 where they intersect eye sleeve 7 are ribs 11, 12 dependent from said sleeve and integral with both sleeve and pillars. Pillars 6, 6, rib 11 and the upper end of bosses 10, 10 outline hole 13 which is intersected by slot $a9$ between jaws 9 and bosses 10. Pillars 6, 6, rib 12 and the back 8 of said jaws outline hole 14 in the back of said hook. Eye sleeve 7 has eye 15 therethrough.

To one end of cable 16 is affixed knob 17 and the other end of said cable is reeved through eye 15, as in Figs. 1 and 2; the cable end connected to the bull hook, not shown, is broken away and indicated at $a16$, also, as stated, the cable loop for surrounding the log, not shown, is broken away.

When in operative position, as shown in full lines, knob 17 stands between the lower ends of pillars 6, 6 and behind bosses 10, 10, between which it is too large to pass, and bears on jaws 8, 9, 9, while the cable 16 fixed thereto is in slot $a9$ proximate to the back 8 of said jaws. Therefore, since cable 16 may not pass farther back between the jaws in slot $a9$ and since it may not move forward because of bosses 10, 10, it will not disengage from the hook without first being moved longitudinally upward. The area between the upper ends of pillars 6, 6 and ribs 11 and 12 forms a socket large enough to receive the upper end of knob 17, and in operation it is not unusual for cable 16 to move upward in slot $a9$ till knob 17 is in its dotted-line position at 17″ in Fig. 3 in which position it is still engaged in the hook by said socket.

Hole 13 is made slightly higher than knob 17 and wider than the diameter of said knob so that the knob may pass out of the hook and into the same by passing through the position shown in dotted lines at 17′ in Fig. 3. Thus to disengage cable 16 and knob 17 thereon from the hook it is moved longitudinally upward in the hook till the knob is opposite hole 13 when it is moved through vertical parallel positions through said hole to a position of disengagement without the hook.

To engage said cable and knob with the hook it is presented in a position in front of the hook parallel with its operative position with the knob in front of hole 13 when it is passed through said hole to the interior, passing through position 17′, and then by a longitudinal movement downward the bottom of the knob is seated on the jaws and the cable is in operative engagement with the hook as shown in full lines.

It may be noted that because of the socket between the pillars and ribs 11 and 12 into which knob 17 may enter when cable 16 is slack this hook has a more positive engagement with its cable than does the hook disclosed in my patent referred to.

There is a way to make the cable have a yet more positive engagement with the hook disclosed in Fig. 5 whereto cable end $b16$ is affixed knob 18. As stated, the hook shown in Fig. 5 is in every way similar to the hook shown in Figs. 1-4, but knob 18 is higher or longer than knob 17, in fact so much longer that it can not pass through hole 13 when in its dotted-line position shown in Fig. 5 at 18″, which is longitudinally above its operative position shown in full lines at 18. However, the diameter of knob 18 is no larger than the diameter of knob 17 and it together with its cable may be removed from engagement with the hook by swinging cable $b16$ upward toward the left till it occupies a horizontal position when knob 18 is placed opposite hole 13 and the cable and knob may be removed from the hook by passing them outward through positions parallel with and in the same horizontal plane with the dotted-line position at $b16'$.

Similarly, the cable $b16$ may be engaged with the hook by presenting the knob end on in front of hole 13 with the cable horizontal when the knob may be caused to enter the hook through hole 13 and when cable $b16$ is swung downward to be in slot $a9$ the cable and knob are placed in their full line position in Fig. 5 with the knob bearing on jaws 8, 9, 9 in position to resist operative strains on said cable.

Inasmuch as the cable and knob would very seldom in operation pass into their illustrated position at $b16'$, $18'$, longer knob 18 with its cable makes a more positive engagement with the hook than does shorter knob 17 with its cable.

But it may be noted that more slack is required in the cable and thus more time is required in operating knob 18 with its cable than is required in operating knob 17 with its cable.

Having thus disclosed my invention, what I claim as new therein and desire to secure by Letters Patent is,—

In a choker hook rigging in combination, a choker hook consisting of a sleeve eye, U-form hook jaws, a hook shank disposed between said sleeve eye and said jaws integral therewith, a socket beneath said sleeve eye opposite said jaws, and a boss projecting from the point of each of said jaws toward said eye, said shank having a transverse hole therethrough intersected by a narrower slot between said jaws and said bosses; and a cable narrower than said slot with a cylindrical knob smaller than said hole and wider than said slot centrally fixed on one end of said cable axially therewith, said cable operatively disposed between said jaws with the inner end of said knob seated on said jaws behind said bosses and the outer end of said knob adapted to enter said socket as said cable moves within said hook between said jaws.

OSCAR A. WIRKKALA.